(12) United States Patent
VerWys et al.

(10) Patent No.: US 8,801,509 B2
(45) Date of Patent: Aug. 12, 2014

(54) RATCHETING GAMBREL DEVICE

(75) Inventors: Paul W. VerWys, Kentwood, MI (US); Norman L. Felker, Jr., Grandville, MI (US)

(73) Assignee: Indiana Mills & Manufacturing Inc., Indianapolis, IN (US)

( * ) Notice: Subject to any disclaimer, the term of this patent is extended or adjusted under 35 U.S.C. 154(b) by 284 days.

(21) Appl. No.: 13/430,835

(22) Filed: Mar. 27, 2012

(65) Prior Publication Data

US 2012/0252338 A1 Oct. 4, 2012

Related U.S. Application Data

(60) Provisional application No. 61/469,884, filed on Mar. 31, 2011.

(51) Int. Cl.
*A22B 5/06* (2006.01)
*A22B 7/00* (2006.01)

(52) U.S. Cl.
CPC .. *A22B 7/002* (2013.01); *A22B 5/06* (2013.01)
USPC .......................................................... 452/189

(58) Field of Classification Search
USPC ............ 452/185, 187–192, 197; 294/79, 104, 294/103 R, 102 R, 1 R
See application file for complete search history.

(56) References Cited

U.S. PATENT DOCUMENTS

| | | | |
|---|---|---|---|
| 5,282,706 A | 2/1994 | Anthony et al. | |
| 5,288,265 A * | 2/1994 | Beason et al. | 452/192 |
| 5,369,848 A | 12/1994 | Huang | |
| 5,560,086 A | 10/1996 | Huang | |
| 5,562,534 A * | 10/1996 | McGough | 452/187 |
| 5,591,077 A * | 1/1997 | Rowe | 452/189 |
| 5,774,915 A | 7/1998 | Scott et al. | |
| 5,778,496 A | 7/1998 | Huang | |
| 5,819,377 A | 10/1998 | Huang | |
| 5,820,455 A * | 10/1998 | Breedlove | 452/187 |
| 5,894,638 A | 4/1999 | Huang | |
| 5,943,742 A | 8/1999 | Huang | |
| 6,007,053 A | 12/1999 | Huang | |
| 6,139,234 A | 10/2000 | Huang | |
| 6,435,801 B2 * | 8/2002 | Talbott | 414/462 |
| 6,457,701 B1 | 10/2002 | Huang | |
| 6,524,041 B1 | 2/2003 | Voiculescu | |
| 6,609,275 B1 | 8/2003 | Lin | |
| 6,641,116 B1 | 11/2003 | Huang | |
| 6,739,964 B2 * | 5/2004 | Gearhart | 452/187 |
| 7,107,655 B1 | 9/2006 | Huang | |
| 7,350,767 B2 | 4/2008 | Huang | |
| 7,412,754 B2 | 8/2008 | Hanson | |
| 7,476,149 B2 * | 1/2009 | Burrows | 452/187 |
| 7,503,736 B1 | 3/2009 | Chen | |
| 7,789,603 B2 | 9/2010 | Huck | |
| 8,592,696 B2 * | 11/2013 | Garner et al. | 177/126 |
| 2004/0084558 A1 | 5/2004 | Huang | |
| 2004/0094650 A1 | 5/2004 | Huang | |
| 2006/0197071 A1 | 9/2006 | Huang | |

* cited by examiner

*Primary Examiner* — Richard Price, Jr.
(74) *Attorney, Agent, or Firm* — Frost Brown Todd LLC

(57) ABSTRACT

A device is provided for lifting, hanging, or securing an object. The device includes a hanger, a plate, and a ratcheting assembly. The hanger includes a pair of arms with hook members extending from the arms and a strut secured between the pair of arms. The plate is secured to the hanger and the ratcheting assembly. The ratcheting assembly includes a buckle with a lever pivotable relative to a body portion. The buckle also includes a pawl member that selectively engages a ratcheting gear. A strap is secured to the buckle and is selectively extendable and retractable relative to the buckle. A hook is provided at the free end of the strap.

17 Claims, 9 Drawing Sheets

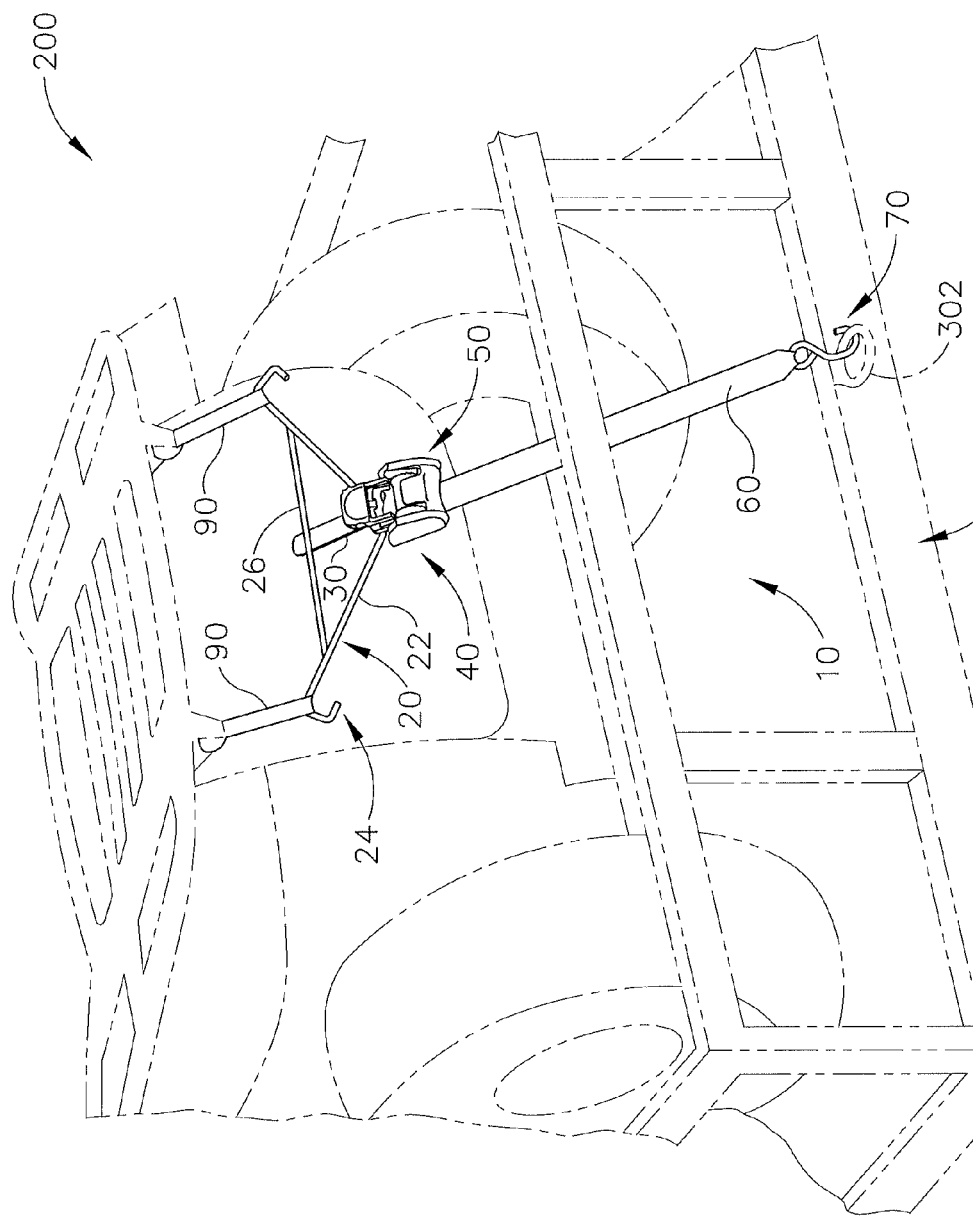

RATCHETING GAMBREL DEVICE

PRIORITY

This application claims priority to U.S. Provisional Patent Application Ser. No. 61/469,884, entitled "Ratcheting Gambrel Device," filed Mar. 31, 2011, the disclosure of which is incorporated by reference herein.

BACKGROUND

The term "gambrel" may be used to refer to a device that is used to lift and/or hang a deceased animal. For instance, in a hunting context, the legs of a deceased animal (e.g., a deer, etc.) may be secured to a gambrel device, and the gambrel device may then be lifted to raise the deceased animal at least partially off the ground. The gambrel device may also be secured to a fixed object such as a tree branch, grounded frame, etc., to suspend the animal off of the ground to facilitate field dressing of the animal. As another example, a gambrel device may be used to assist in lifting of the animal onto a vehicle such as a truck, ATV, UTV, etc. While conventional gambrel devices may provide a substantially rigid structure to allow a person to manipulate one end of the animal, such devices may also be difficult to lift when the animal is secured to them, to secure the gambrel device to a fixed overhead object such as a tree branch, building rafter, etc., particularly when the animal is relatively large and heavy. For instance, if a person attempting to lift the animal by the gambrel to secure the gambrel to a tree branch becomes fatigued during lifting, the person may need to lower the animal back down to the ground and start over. Furthermore, it may be difficult to secure the gambrel to a fixed object such as a tree branch while also holding the weight of an animal that is secured to the gambrel.

While a variety of gambrel devices have been made and used, it is believed that no one prior to the inventor(s) has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements and in which:

FIG. 10 depicts a perspective view of the gambrel device of FIG. 1 with the gambrel device being used to secure an ATV in a trailer.

Figure 1:
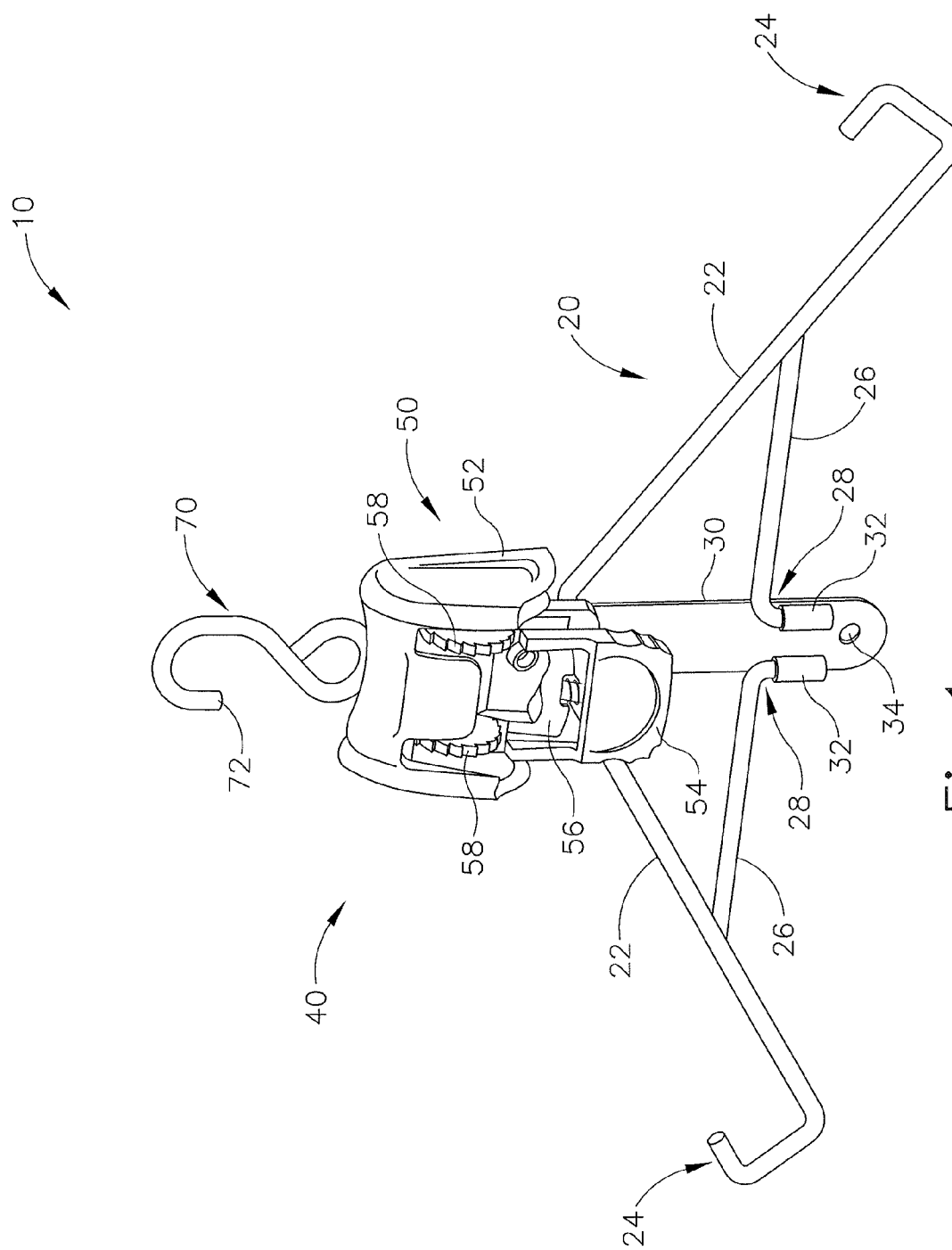
FIG. 1 depicts a perspective view of an exemplary ratcheting gambrel device.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

FIGS. 1-6 illustrate an exemplary ratcheting gambrel device (10). Gambrel device (10) of this example includes a hanger (20) and a ratcheting assembly (40). Hanger (20) includes a pair of arms (22) that together form an angle whose vertex is substantially centered generally near the bottom of ratcheting assembly (40). The free end of each arm (22) is turned generally upward and then generally inward to form hook members (24).

A pair of struts (26) extend between and are secured to lower portions of arms (22), near hook members (24), substantially preventing arms (22) from being bent toward each other when heavy downward loads are placed on hook members (24). By way of example only, struts (26) may be welded to arms (22) or be secured to arms (22) by brackets, etc. As best seen in FIG. 1, struts (26) are also secured to a plate (30), which is substantially centered in the angle defined by arms (22), and which is also secured relative to the top portions of arms (22). In the present example, downwardly bent portions (28) of struts (26) are inserted in corresponding channels (32) that are integral with plate (30). Of course, struts (26) may be secured to plate (30) in any other suitable fashion, including but not limited to being secured to plate (30) by welding, brackets, etc. Furthermore, it should be understood that a single strut (26) may be secured to both arms (22) and plate (30) instead of using two struts (26). It should also be understood that arms (22) may be secured to plate (30) in any suitable fashion, including but not limited to channels, welding, brackets, etc.

In the present example, hanger (20) is formed of steel, though it should be understood that any other suitable material or combination of materials may be used. In addition, hanger (20) is sized and configured to hold and bear the weight of a substantially large animal, such as a large male deer, boar, bear, etc. Of course, hanger (20) may be sized and configured to hold and bear the weight of animals of any other suitable size. It should also be understood that plate (30) may have sufficient strength to hold the weight of a large animal. For instance, as best seen in FIG. 1, an opening (34) is formed through a bottom portion of plate (30). An S-hook, carabiner, or other component or device may be inserted in opening (34), and the animal may be secured to such a component in any suitable fashion, including but not limited to by way of straps, etc. Other suitable ways in which an animal may be secured to gambrel device (10) will be apparent to those of ordinary skill in the art in view of the teachings herein.

Figure 3:
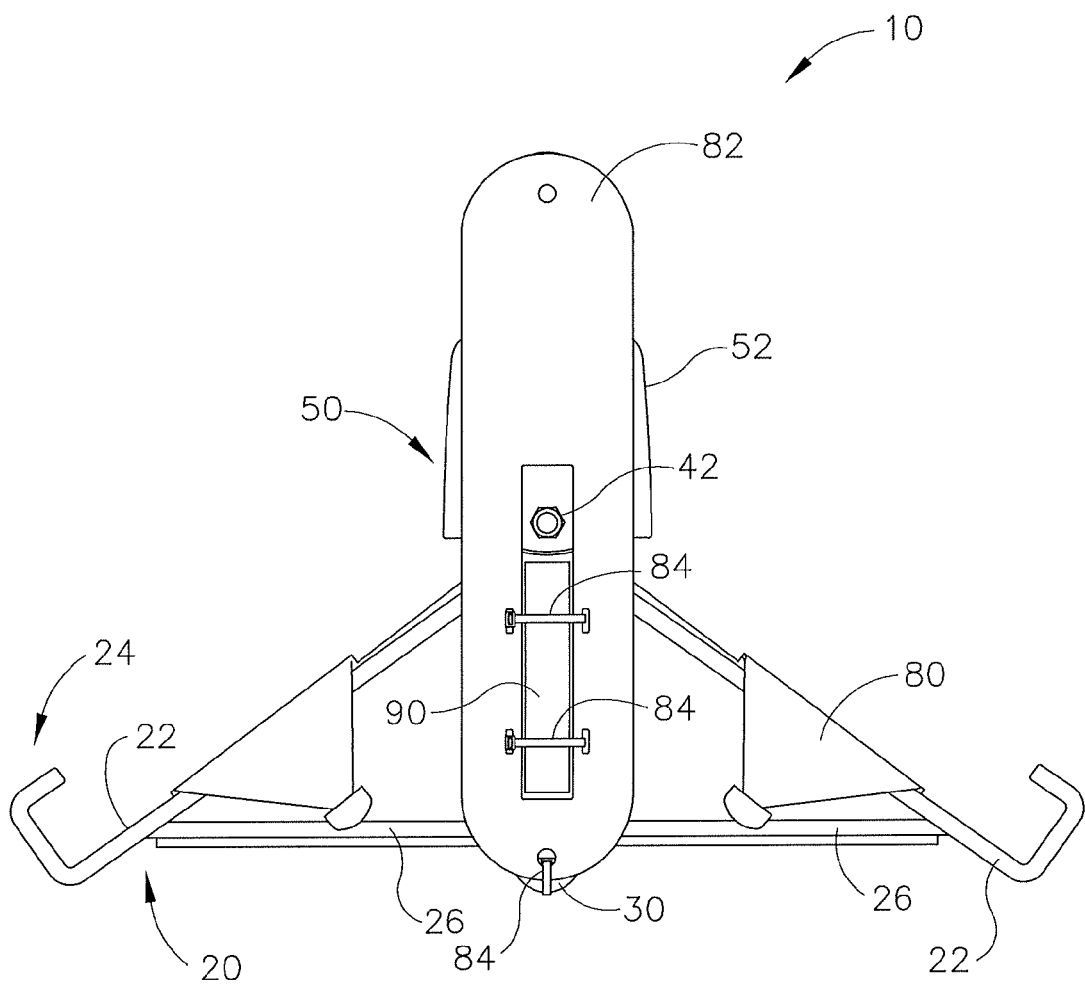
FIG. 3 depicts a rear elevational view of the gambrel device of FIG. 1, with optional packaging components.

Ratcheting assembly (40) is also secured to plate (30) in the present example, such that hanger (20), plate (30), and ratcheting assembly (40), together form a substantially unitary construction. In particular, and as best seen in FIG. 3, ratcheting assembly (40) is secured to plate (30) by a bolt (42). Of course, ratcheting assembly (40) may alternatively be secured to plate (30) in any other suitable fashion. In addition or in the alternative, ratcheting assembly (40) may be secured directly to hanger (20). As will be described in greater detail below, ratcheting assembly (40) is operable to facilitate lifting of an animal that is secured to hanger (20) and to also selectively secure the position of the animal above the ground.

In some versions of gambrel device (10), ratcheting assembly (40) comprises a modified version of a CARGOBUCKLE® brand tie-down system by Indiana Mills and Manufacturing, Inc. of Westfield, Ind. It should therefore be understood that any or all components of ratcheting assembly (40) may be identical to, substantially identical to, or similar to a CARGOBUCKLE® brand tie-down system by Indiana Mills and Manufacturing, Inc. of Westfield, Ind. In addition or in the alternative, it should be understood that any or all components of ratcheting assembly (40) may be constructed and/or operable in accordance with the teachings of U.S. Pat. No. 7,789,603, entitled "Retractable Tie Down Device," issued Sep. 7, 2010, the disclosure of which is incorporated by reference herein.

Ratcheting assembly (40) of the present example includes a buckle (50), a strap (60), and a hook (70). Buckle (50) includes a body (52) and a lever (54), which is pivotable relative to body (52). Buckle (50) also includes a pawl fork (56) and a pair of ratcheting gears (58). Ratcheting gears (58) are both unitarily secured to a spool or spindle (not shown) that is rotatable within buckle (50). Pawl fork (56) is coupled with lever (54) such that pawl fork (56) pivots with lever (54) relative to body (52). However, pawl fork (56) is also movable relative to lever (54). In particular, while lever (54) is pivotable relative to body (50), lever (54) is not movable in a radial dimension relative to body (50); yet pawl fork (56) is movable in a radial dimension relative to body (50) to selectively disengage teeth of ratcheting gears (58). A spring (not shown) resiliently biases pawl fork (56) into engagement with teeth of ratcheting gears (58), yet allows pawl fork (56) to be squeezed toward lever (54) and away from body (52) to disengage teeth of ratcheting gears (58). In the present example, buckle (50) is configured such that lever (54) and pawl fork (56) must be together rotated to a position relative to body (52) where lever (54) and pawl fork (56) are substantially perpendicular to plate (30) before pawl fork (56) can be squeezed toward lever (54) and away from body (52) to disengage teeth of ratcheting gears (58). As another illustrative example, buckle (50) may be configured such that pawl fork (56) may be squeezed toward lever (54) and away from body (52) to disengage teeth of ratcheting gears (58) regardless of the rotational position of lever (54) and pawl fork (56) relative to body (52).

Buckle (50) is configured such that strap (60) selectively winds and unwinds from the spool or spindle in buckle (50). In particular, when pawl fork (56) is disengaged from ratcheting gears (58), the spool or spindle may rotate substantially freely within body (52), allowing strap (60) to substantially freely wind and unwind from the spool or spindle to selectively retract or extend strap (60) relative to buckle (50). When pawl fork (56) is engaged with ratcheting gears (58), such engagement may restrict rotation of the spool or spindle, thereby restricting the winding and unwinding of strap (60) from the spool or spindle. For instance, in the present example, pawl fork (56) and ratcheting gears (58) are configured such that, when pawl fork (56) is engaged with ratcheting gears (58), pawl fork (56) and ratcheting gears (58) allow the spool or spindle of buckle (50) to rotate within body (52) in only one direction, such that strap (60) to be retracted into body (50) but not be pulled and extended from body (50). Thus, in order to pull and extend strap (60) from body (50), pawl fork (56) must be disengaged from ratcheting gears (58) in the present example, such as by squeezing pawl fork (56) toward lever (54) and away from body (52) and/or by rotating pawl fork (56) and lever (54) to a position that is substantially perpendicular to plate (30).

In addition, when pawl fork (56) is engaged with ratcheting gears (58), lever (54) may be used to ratchetingly rotate the spool or spindle of buckle (50), thereby pulling strap (60) into body (50). For instance, lever (54), pawl fork (56), and ratcheting gears (58) may be configured such that lever (54) may be repeatedly rotated/rocked relative to body (e.g., from a downward position to a position that is substantially perpendicular to plate (30), then back to the downward position, then back to the position that is substantially perpendicular to plate (30), etc.). Each repeated action of lever (54) may rotate the spool or spindle of buckle (50) in quarter-turn increments (or any other suitable increments), providing corresponding incremental retraction of strap (60) into body (50). Buckle (50) may also include a feature that selectively locks and/or unlocks disengagement of pawl fork (56) from ratcheting gears (58), such that pawl fork (56) may be fully disengaged from ratcheting gears (58) to allow pulling/extension of strap (60) from body (50) when lever (54) and pawl fork (56) are substantially perpendicular to plate (30) in one mode; and such that pawl fork (56) may be still engaged with ratcheting gears (58) during ratcheting retraction of strap (60) into body (50) as lever (54) and pawl fork (56) are moved to a position substantially perpendicular to plate (30) in another mode. Alternatively, buckle (50) may be configured such that pawl fork (56) must always be squeezed toward lever (54) and away from body (50) in order to disengage pawl fork (56) from ratcheting gears (58), even if lever (54) is rotated to a position that is substantially perpendicular to plate (30). Various suitable components, features, and configurations that may provide such operation of buckle (50) will be apparent to those of ordinary skill in the art in view of the teachings herein.

It should also be understood that, in some versions, the spool or spindle in buckle (50) may be resiliently biased to retract strap (60) into body (50) when pawl fork (56) is disengaged from ratcheting gears (58). In such versions, a spring or other resilient member biasing the spool or spindle may nevertheless have a spring constant selected to provide little enough resistance to pulling/extension of strap (60) from body (50) when pawl fork (56) is disengaged from ratcheting gears (58), such that strap (60) may be pulled/extended from body (50) with relative ease when pawl fork (56) is disengaged from ratcheting gears (58). Still other suitable components, features, and configurations that may be incorporated into buckle (50) will be apparent to those of ordinary skill in the art in view of the teachings herein, including the teachings of U.S. Pat. No. 7,789,603.

Figure 2:
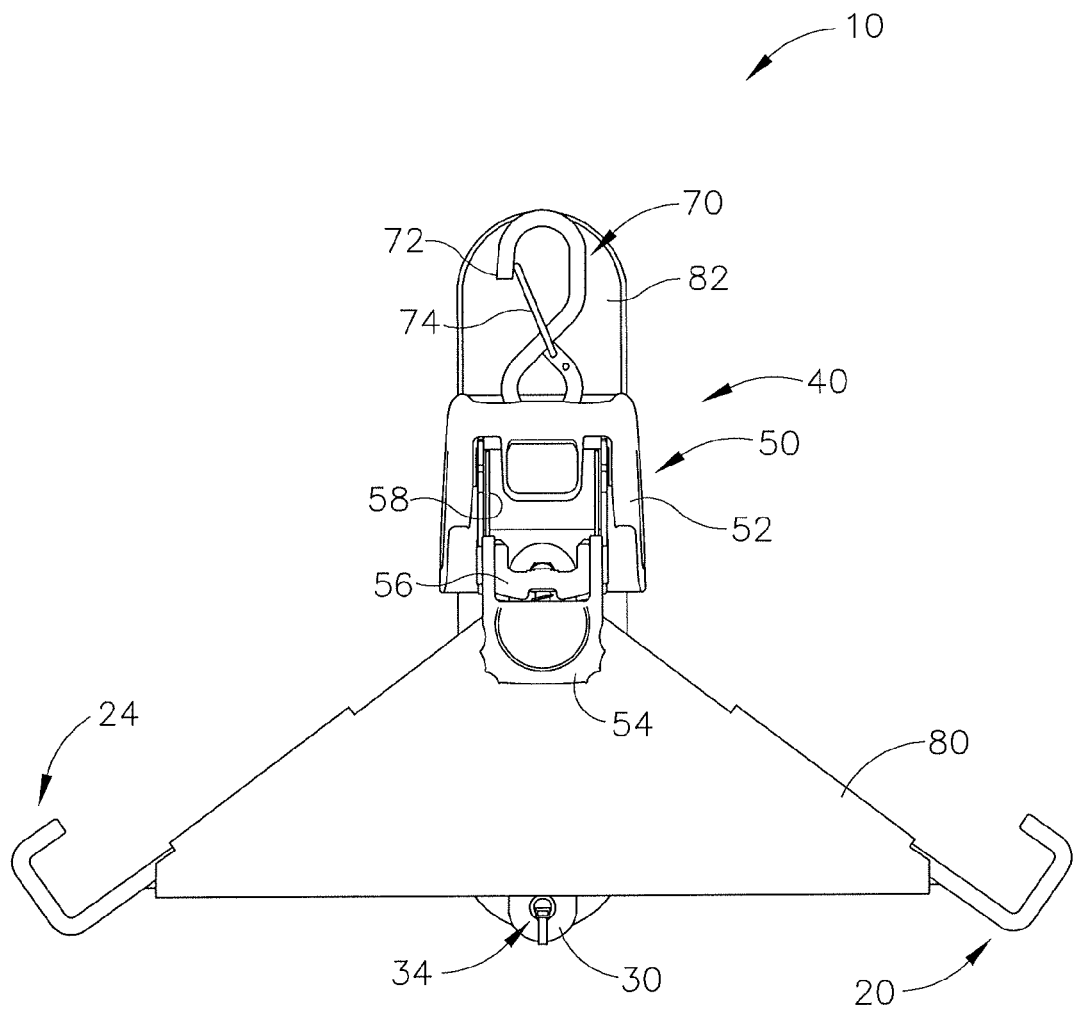
FIG. 2 depicts a front elevational view of the gambrel device of FIG. 1, with optional packaging components.
Figure 4:
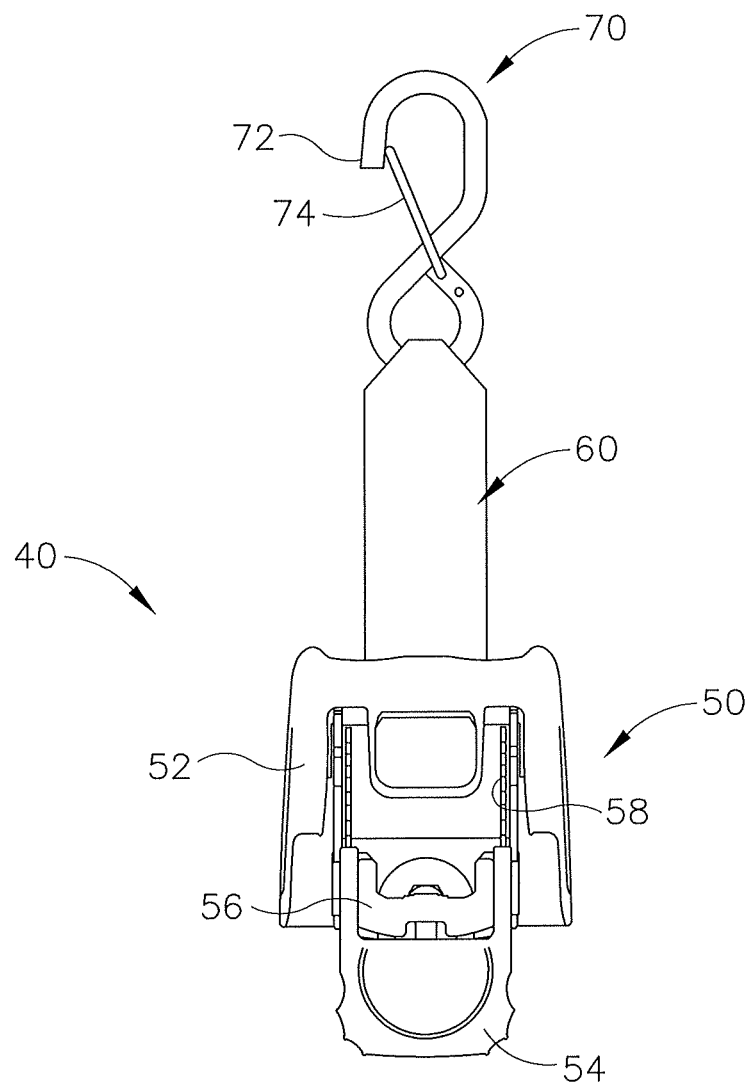
FIG. 4 depicts a front elevational view of the ratcheting assembly of the gambrel device of FIG. 1, with a strap partially extended.
Figure 5:
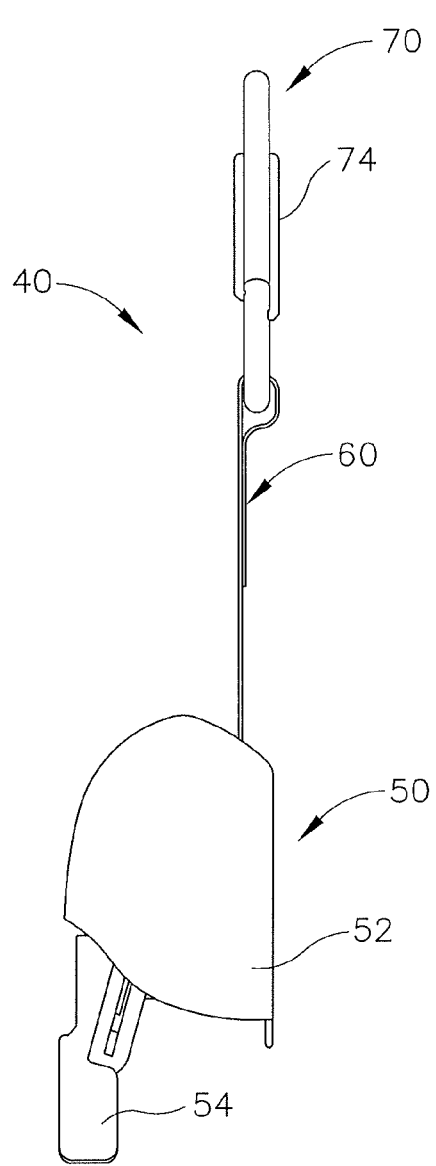
FIG. 5 depicts a right side elevational view of the ratcheting assembly of FIG. 4.

Strap (60) of the present example comprises nylon webbing having significant tensile strength. In particular, and like other components described herein, strap (60) is strong enough to bear at least the weight of a large animal (e.g., a male deer, boar, bear, etc.). Strap (60) may be configured similar to a conventional seatbelt used in automobiles and trucks, etc. Hook (70) is secured to the free end of strap, and also has sufficient strength to bear the weight of a large animal. Hook (70) of the present example comprises an s-hook having a free end (72). As shown in FIG. 1, free end (72) may be left substantially open. In some other versions, as shown in FIGS. 2 and 4, hook (70) also includes a pivoting keeper (74), which is resiliently biased to bear against free end (72). Keeper (74) is pivotable inwardly away from free end (72) but not outwardly away from free end (72) in this example. Keeper (74) is thus configured to substantially prevent a strap or loop, etc. that is engaged with hook (70) from inadvertently slipping off free end (72); while also allowing a strap or loop to be engaged with hook (70) by slipping a strap or loop over free end (72) and into engagement with hook (70). Of course, hook (70) of the present example is merely illustrative, and a variety of other components or configurations may be used. By way of example only, hook (70) may be replaced with a carabiner, etc. In some exemplary uses as will be described in greater detail below, gambrel device (10) may be secured to a fixed object such as a tree branch, building rafter, or grounded frame, etc. by first securing a strap to the fixed object, then securing hook (70) to the strap.

Figure 6:
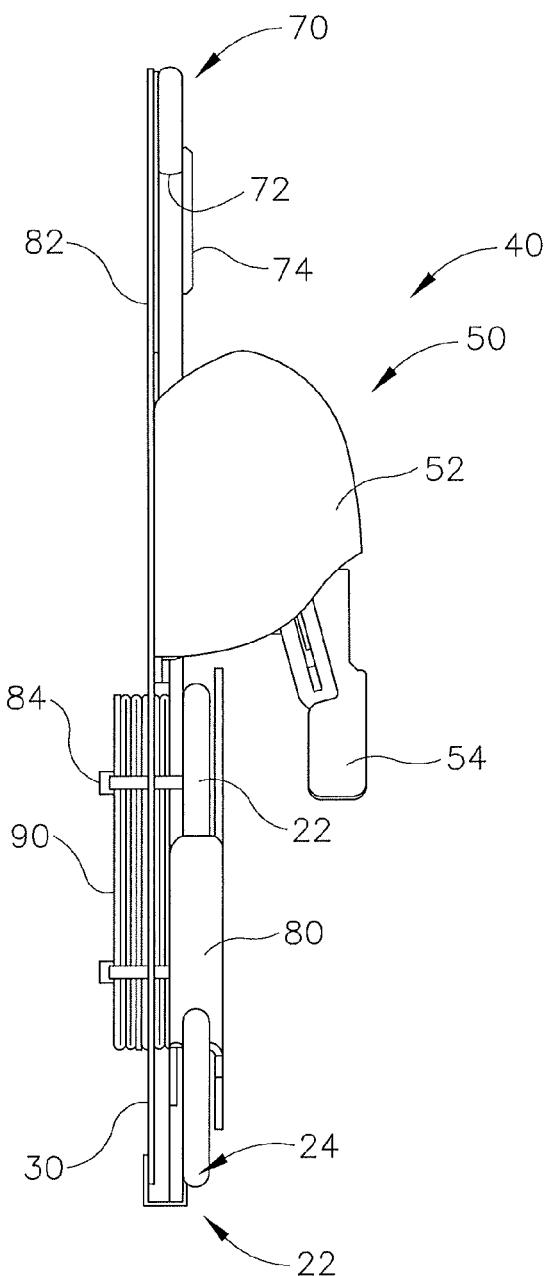
FIG. 6 depicts a left side elevational view of the gambrel device of FIG. 1, with optional packaging components.

FIGS. 2-3 show exemplary packaging components that may be used with gambrel device (10). In particular, FIGS. 2-3 show a header (80) secured to hanger (20) and a label (82) secured to plate (30). Of course, header (80) and label (82) need not be provided with gambrel device (10) and/or may simply be provided for display of gambrel device (10) in a store. FIGS. 3 and 6 also show a folded up strap (90) that is secured to plate (30) by cable ties (84). Strap (90) may be provided to assist in securing hook (70) to a tree branch or other fixed object as described elsewhere herein. Alternatively, strap (90) may be provided in any other suitable fashion, if at all.

Figure 7:
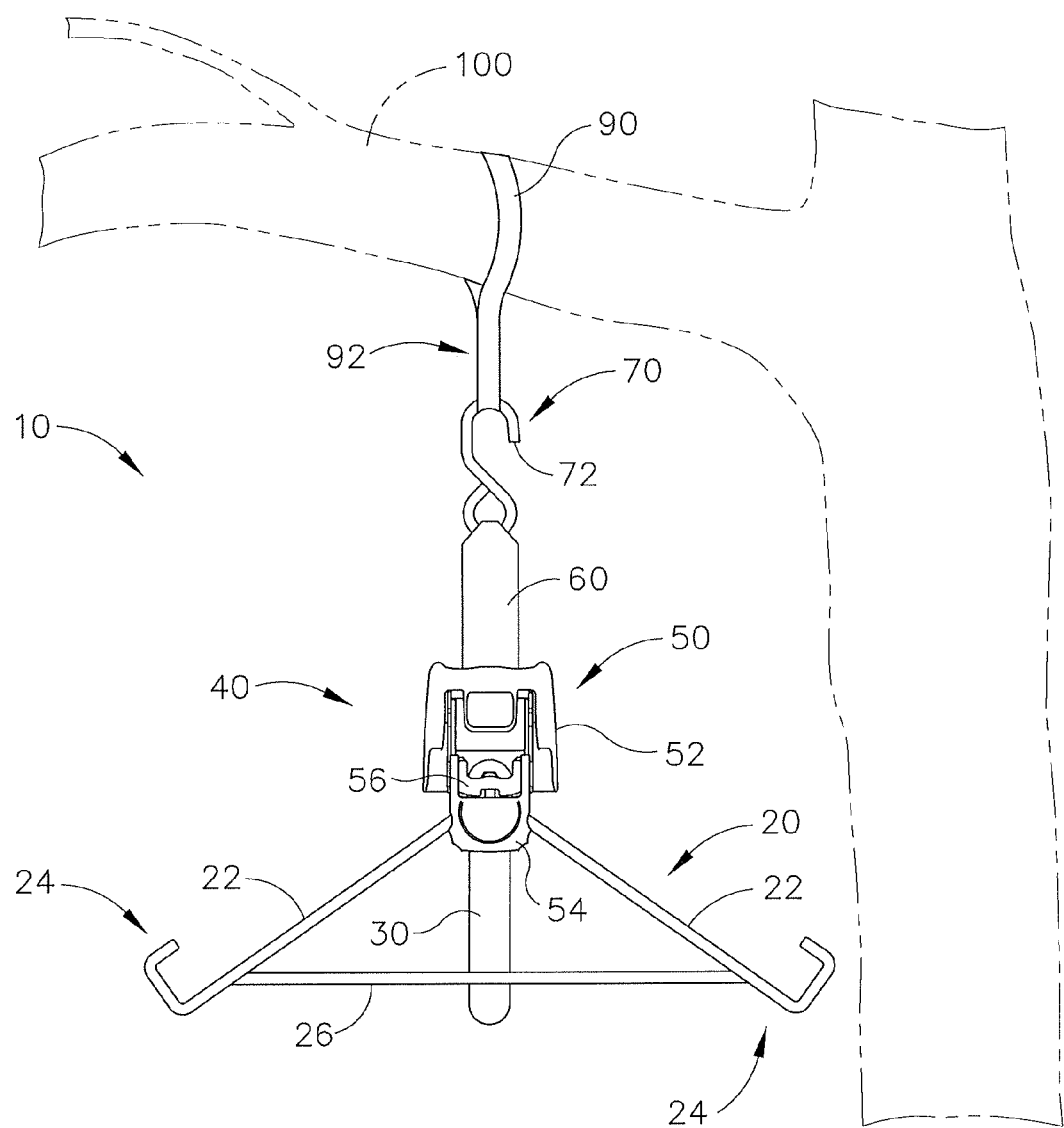
FIG. 7 depicts a front elevational view of the gambrel device of FIG. 1 secured to a tree branch.

FIGS. 7-10 show various exemplary uses for gambrel device (10). It should be understood that these examples are merely illustrative. Various other suitable uses for gambrel device (10) will be apparent to those of ordinary skill in the art in view of the teachings herein. As shown in FIG. 7, strap (90) may be secured to a tree branch (100). Strap (90) may form a loop (92), and hook (70) may be secured to strap (90) by feeding free end (72) through loop (92). With gambrel device (10) secured to tree branch (100) by strap (90) and hook (70), gambrel device (10) may be lowered toward the ground and then be secured to an animal to raise the animal off the ground. For instance, with gambrel device (10) secured to tree branch (100) by strap (90) and hook (70), pawl fork (56) may be disengaged from ratcheting gears (58), such as by squeezing pawl fork (56) toward lever (54) and away from body (52). With pawl fork (56) disengaged from ratcheting gears (58), strap (60) may be pulled substantially freely from the spool or spindle of buckle (50), thereby extending strap (60) from buckle (50) to lower hanger (20) to the ground where the animal lies. The animal may then be secured to hanger (20), and gambrel device (10) may then be used to raise the animal up and hold the animal in a raised position, with support from tree branch (100).

Figure 8:
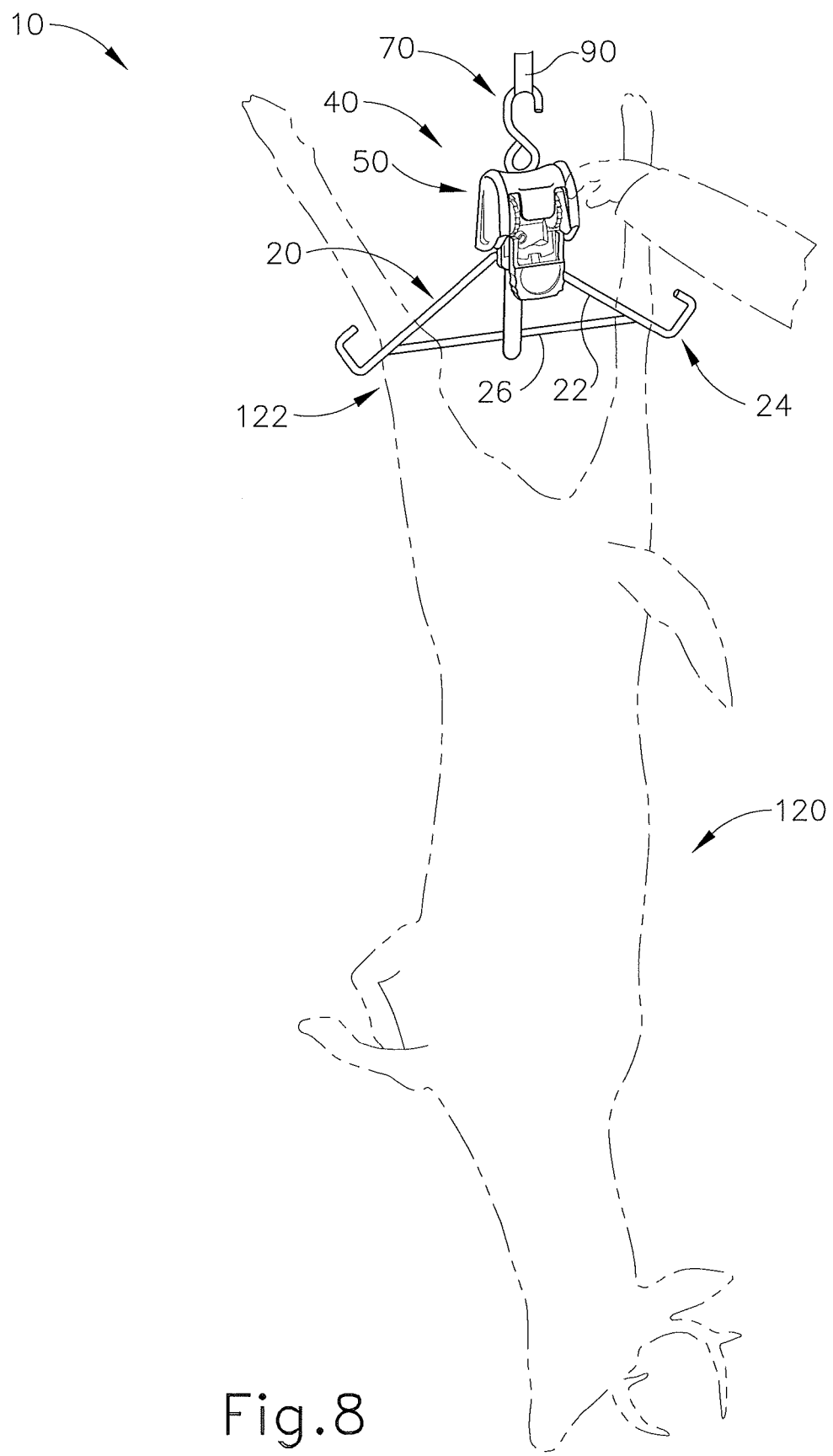
FIG. 8 depicts a front elevational view of the gambrel device of FIG. 1 with the gambrel device holding a deer in an exemplary method of securing a deer to the gambrel device.

FIG. 8 shows a deer (120) being lifted to and/or held at a raised position by gambrel device (10). In particular, hanger (20) is secured to deer (120) by passing hook members (24) through rear knees (122) of deer (120). It should be understood that, with the assistance of ratcheting assembly (40), a deer (120) and/or other animal of substantial size and weight may be lifted to a raised position by one person with relative ease. For instance, with pawl fork (56) engaged with ratcheting gears (58), and with hook members (24) engaged with rear knees (122) of deer (120), a person may start lifting deer (120) by pulling up gambrel device (10) by struts (26) until hanger (20) reaches a comfortable height (e.g., about the height of the person's head, etc.). As deer (120) is lifted, and due to one or more resilient members in buckle (50) resiliently biasing strap (60) to a retracted position, strap (60) will automatically retract in buckle (50), with pawl fork (56) and ratcheting gears (58) allowing such retraction despite engagement between pawl fork (56) and ratcheting gears (58). In the event that the person stops pulling up on hanger (20) or if hanger (20) slips from the person's hands, etc., the engagement between pawl fork (56) and ratcheting gears (58) may prevent strap (60) from being pulled/extended from buckle (50), such that the engagement between pawl fork (56) and ratcheting gears will substantially maintain the raised position of deer (120).

At any desired point during lifting of deer (120), the person operating gambrel device (10) may continue to raise deer (120) by repeatedly rotating/rocking lever (54) relative to body (52), thereby incrementally retracting strap (60) into body (52) in a ratcheting fashion. In some versions, this operation may be performed with a single hand. With deer (120) sufficiently raised, the person may perform field dressing on deer (120), load deer (120) on a vehicle, etc. When the person decides to lower deer (120) from tree branch (100) (or whatever other fixed object gambrel device (10) is secured to), the user may simply disengage pawl fork (56) from ratcheting gears (58) as described elsewhere herein.

Figure 9:
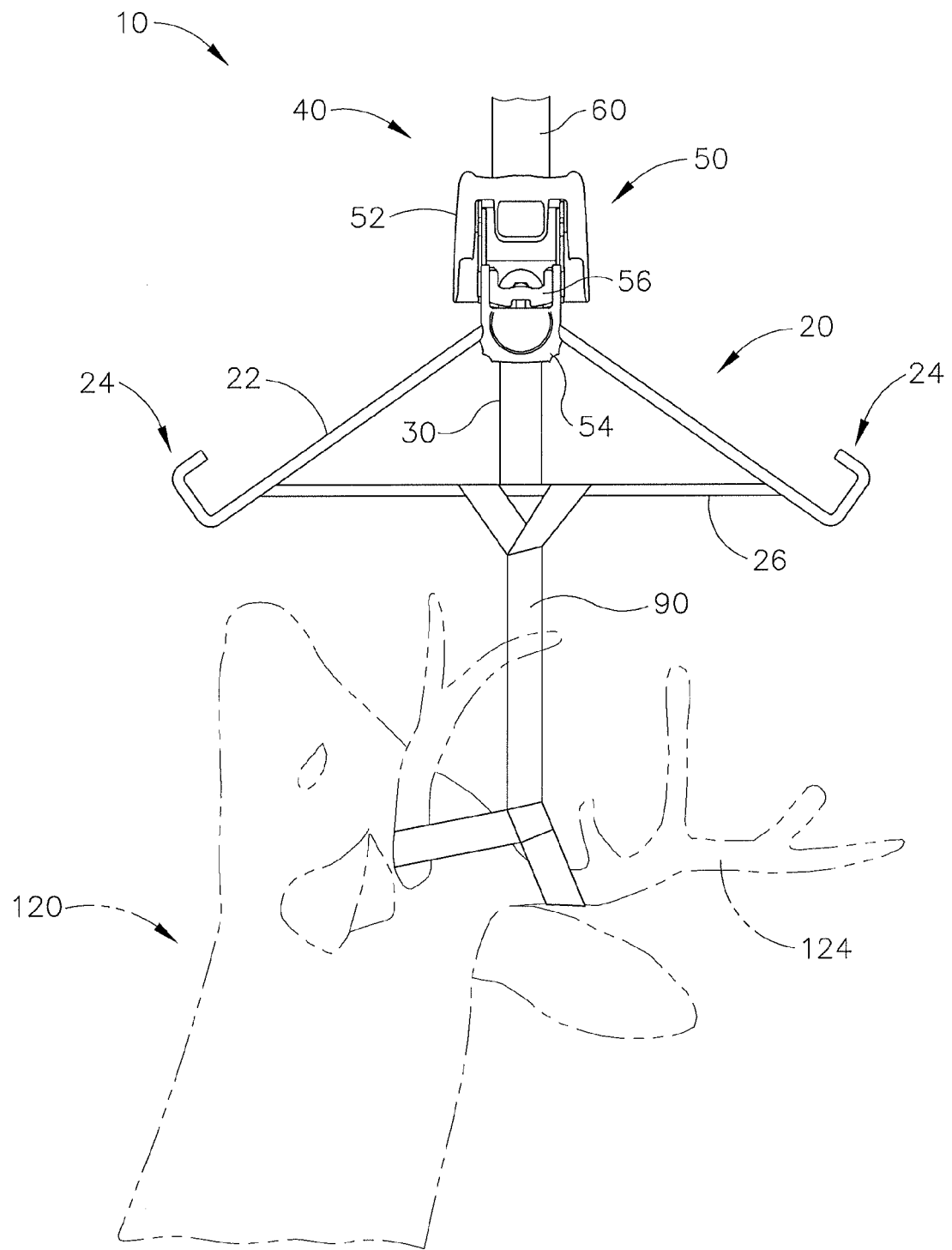
FIG. 9 depicts a front elevational view of the gambrel device of FIG. 1 with the gambrel device holding a deer in another exemplary method of securing a deer to the gambrel device.

FIG. 9 shows another exemplary method by which a deer (120) may be secured to gambrel device (10). In this example, a strap (90) is secured to struts (26) and plate (30). For instance, strap (90) may be wrapped around struts (26) and plate (30). As another example, strap (90) may be secured to plate (30) by a hook (not shown) inserted through opening (34) of plate (30). Strap (90) is also wrapped about the antlers (124) of deer in this example. Deer (120) is thus raised to and held in a lifted position by its head in this example rather than being raised to and held in a lifted position by its hindquarters as shown in FIG. 8. It should be understood that gambrel device (10) may be operated in the same manner in the example shown in FIG. 9 as described elsewhere herein. Still other suitable ways in which gambrel device (10) may be secured to a deer (120) and be used to raise and hold deer (120) in a lifted position will be apparent to those of ordinary skill in the art in view of the teachings herein.

FIG. 10 shows another merely illustrative example of how gambrel device (10) may be used. In this example, gambrel device (10) is not used to lift an object and is not used with an animal. Instead, gambrel device (10) is used to secure an ATV (200) relative to a trailer (300). In particular, straps (90) are secured to ATV (200) and are then secured to hook members (24) of hanger (20). Hook (70) of strap (60) is secured to an eyelet (302) of trailer (300). As with other examples described herein, strap (60) may then be retracted into body (52) of buckle (50) by first pulling buckle (50) toward hook (70) then repeatedly rotating/rocking lever (54) to ratchet strap (60) into body (52). This may be done until strap (60) has sufficient tension to substantially secure the position of ATV (200) relative to trailer (300). It should be understood that one or more gambrel devices (10) may be used at other sides of ATV (200) and trailer (300) to further secure the position of ATV (200) relative to trailer (300). Still other suitable ways in which gambrel device (10) may be used will be apparent to those of ordinary skill in the art in view of the teachings herein.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

We claim:

1. A device comprising:
    (a) a hanger, wherein the hanger comprises a pair of arms, wherein the pair of arms define an angle, wherein a free end of each arm of the pair of arms comprises a hook member;
    (b) an attachment feature, wherein the attachment feature is secured to the pair of arms, wherein the attachment feature is substantially centered near the angle defined by the pair of arms; and
    (c) a ratcheting assembly secured to the attachment feature, wherein the ratcheting assembly comprises:
        (i) a buckle comprising a body portion and a lever, wherein the lever is pivotable relative to the body portion, wherein the buckle further comprises a pawl member and at least one ratcheting gear, wherein the pawl member is configured to selectively engage the at least one ratcheting gear,
        (ii) a strap secured to the buckle, wherein the strap is selectively extendable and retractable relative to the buckle, wherein the strap comprises a free end, and
        (iii) a hook secured to the free end of the strap.

2. The device of claim 1, wherein the hanger comprises at least one strut extending between the pair of arms, wherein the at least one strut is secured between the pair of arms.

3. The device of claim 2, wherein the at least one strut is secured near the hook members.

4. The device of claim 1, wherein the hanger comprises a pair of struts, each strut having a downwardly bent portion, wherein the attachment feature comprises a pair of channels, and wherein the downwardly bent portion of each strut is insertable within the channels.

5. The device of claim 1, wherein the bottom portion of the attachment feature comprises an opening.

6. The device of claim 1, wherein the hook comprises an S-hook having a free end.

7. The device of claim 6, wherein the hook comprises a pivoting member sized to close the free end of the hook, wherein the pivoting member is resiliently biased against the free end of the hook.

8. The device of claim 1, wherein the buckle comprises a pair of ratcheting gears secured to a spool member rotatable within the buckle, and wherein at least a portion of the strap is configured to wrap around the spool member, and wherein the spool member is resiliently biased to retract the strap into the body portion of the buckle.

9. The device of claim 1, wherein the attachment feature comprises a plate.

10. The device of claim 1, wherein the pawl member is coupled with the lever, wherein the pawl member and the lever are pivotable together relative to the body portion.

11. The device of claim 1, wherein the pawl member is movable relative to the lever and wherein the pawl member is movable in a radial direction relative to the body portion.

12. The device of claim 1, wherein the strap is freely extendable or retractable when the pawl member is disengaged with the ratcheting gear.

13. The device of claim 1, wherein the ratcheting gear is rotatably restricted when the pawl member is engaged with the ratcheting gear.

14. The device of claim 13, wherein the ratcheting gear is rotatable in a single direction when the pawl member is engaged with the ratcheting gear.

15. The device of claim 14, wherein the ratcheting gear is rotatable in a direction operable to retract the strap into the body portion of the buckle.

16. The device of claim 1, wherein the lever is operable to extend or retract the strap.

17. The device of claim 1, wherein the buckle further comprises a locking feature operable to selectively engage the pawl member with the ratcheting gear.

* * * * *